United States Patent [19]

Kavthekar

[11] Patent Number: 4,625,377
[45] Date of Patent: Dec. 2, 1986

[54] METHOD FOR MANUFACTURING UNIVERSAL JOINTS

[76] Inventor: Keshav S. Kavthekar, 43150 Leeds Ct., Canton, Mich. 48188

[21] Appl. No.: 763,558

[22] Filed: Aug. 8, 1985

Related U.S. Application Data

[60] Division of Ser. No. 563,263, Dec. 20, 1983, which is a continuation of Ser. No. 288,320, Jul. 30, 1981, abandoned.

[51] Int. Cl.⁴ .................. B21D 53/10; B23P 13/00
[52] U.S. Cl. ......................... 29/149.5 B; 29/434; 29/27 R; 29/563; 82/12; 409/165; 409/193
[58] Field of Search .......... 29/149.5 B, 148.4 C, 29/148, 149.5 C, 148.4 D, 434, 27 R, 27 A, 39, 563, 558; 403/122, 57; 409/165, 193; 82/12

[56] References Cited

U.S. PATENT DOCUMENTS

| | | | |
|---|---|---|---|
| 1,987,415 | 1/1935 | Padgett | 29/434 |
| 1,994,480 | 3/1935 | Larsen . | |
| 2,304,666 | 12/1942 | Sturges . | |
| 2,425,809 | 8/1947 | Johnson | 29/434 |
| 2,681,596 | 6/1954 | Klomp | 409/165 |
| 2,791,946 | 5/1957 | Hewett | 82/12 |
| 2,867,145 | 1/1959 | Markstrom | 82/12 |
| 2,972,935 | 2/1961 | Wesstrom et al. | 409/193 |
| 3,187,635 | 6/1965 | Koss | 29/558 |
| 3,553,807 | 1/1971 | Laing . | |
| 3,841,199 | 10/1974 | Jepson et al. | 409/165 |
| 3,841,784 | 10/1974 | Mengeringhausen | 29/563 |
| 4,558,502 | 12/1985 | Gössmann | 29/434 |

FOREIGN PATENT DOCUMENTS 56-52145 11/1981 Japan ..................... 29/27 R

*Primary Examiner*—Mark Rosenbaum
*Assistant Examiner*—Irene Golabi
*Attorney, Agent, or Firm*—Alex Rhodes

[57] ABSTRACT

This invention relates to metal cutting and more particularly to method for manufacturing constant velocity universal joints. A construction is disclosed wherein spherical turning, milling and grinding of the races and grooves of the joint members of a universal joint are performed on common machines without removing the workpieces and the workpieces are held in common workheads. During the machining operations, relative movements between the tools and workpieces are referenced to common axes thereby duplicating the relative positions and movements between the workpieces during actual service. The inventive concept provides a means for achieving consistent product quality and is adaptable to the automated manufacturing of constant velocity universal joints.

11 Claims, 30 Drawing Figures ns bobbins
METHOD FOR MANUFACTURING UNIVERSAL JOINTS This is a division of application Ser. No. 563,263 filed Dec. 20, 1983, which is a continuation of application Ser. No. 288,320, now abandoned.

BACKGROUND OF THE INVENTION

Worldwide demand for front and four wheel drive vehicles has created an increasing demand for constant velocity universal joints. The Rzeppa joint, used almost exclusively at the outer ends of front axles, is exemplary of this type of joint.

Named for its inventor, A. H. Rzeppa, it consists of an outer race member, an inner race member, a ball cage and generally six driving balls. The mating surfaces between the members are spherical in shape and close fitting to one another. The driving balls fit into corresponding half grooves of the inner and outer races, the grooves having meridian lines of a sphere as their centerlines. The construction and function of the Rzeppa joint are more fully disclosed in U.S. Pat. Nos. 1,916,442 and 1,975,758.

Heretofore, the manufacture of Rzeppa and similar type joints has required large numbers of specialized machines for spherical turning, milling and grinding of the races and ball grooves. Consequently, large investments have been required which were recovered as part of the purchase price of the universal joint. Also, separate and specialized machines for each of the machining operations has made difficult the maintenance of precision tolerances.

One object of the present invention is to advance the art of metal cutting, particularly the manufacture of Rzeppa and similar type universal joints.

Another object is to provide method for manufacturing universal joints wherein machining operations for close fitting races and mating and corresponding surfaces of joint components are performed on the same machines without removing the workpieces and held in common workheads.

Another object is to provide method for manufacturing universal joints wherein relative movements between the workpieces and cutting tools, during the spherical machining of races and ball grooves, are referenced to common axes thereby duplicating the relationships between the workpieces during actual use.

Another object is to reduce the investment costs for manufacturing universal joints.

Another object is to provide method which are adaptable to the automated machining of universal joints.

The foregoing objects, along with additional objects, features, advantages and benefits of the invention become more apparent in the ensuing description and accompanying drawings which disclose the invention in detail. A preferred embodiment is disclosed in accordance with the best mode contemplated in carrying out the invention. The subject matter in which an exclusive property is claimed is set forth in each of the numbered claims at the conclusion of the description.

DESCRIPTION OF THE PREFERRED EMBODIMENT

Figure 1:
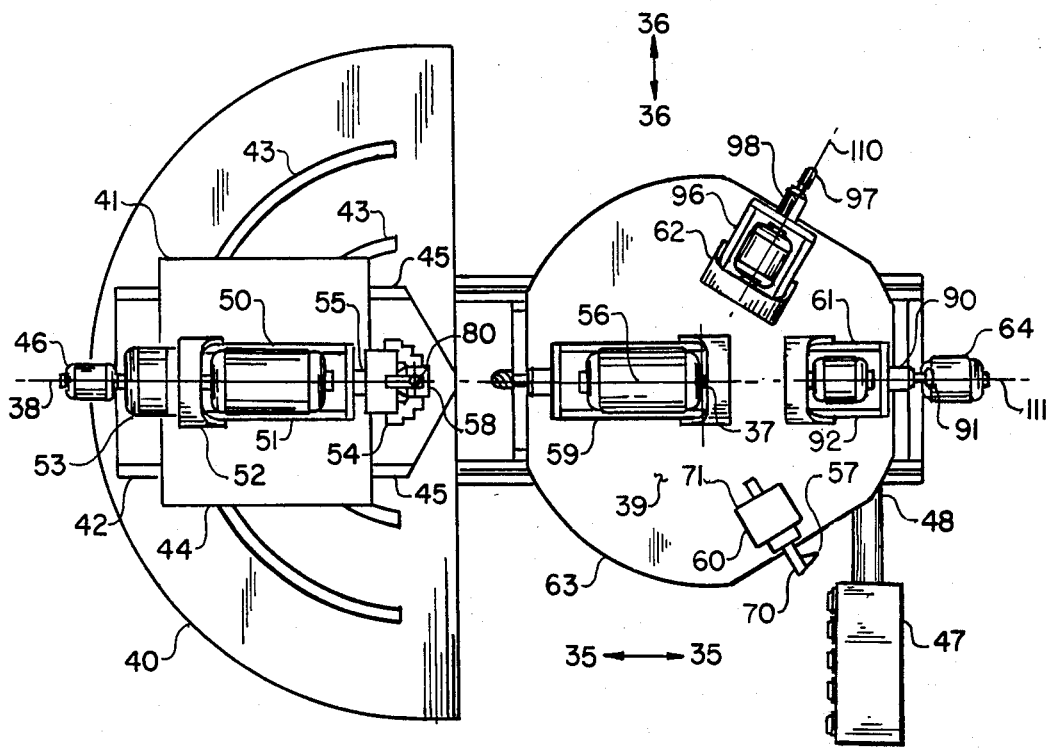
FIG. 1 is a more or less diagrammatic plan view of a machine for manufacturing universal joints embodying the principles of my invention.
Figure 2:
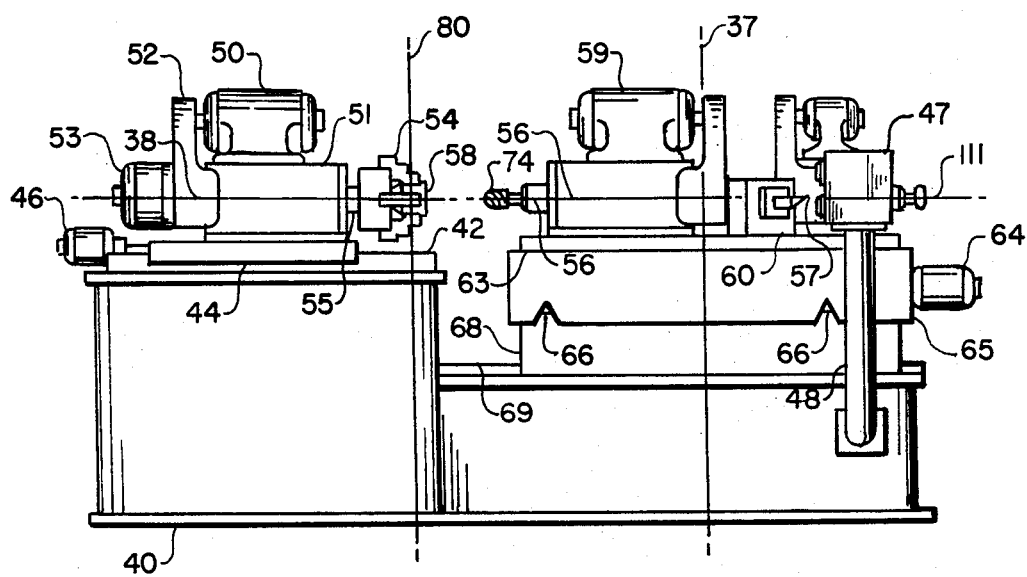
FIG. 2 is a front elevation view of the same machine.
Figure 3:
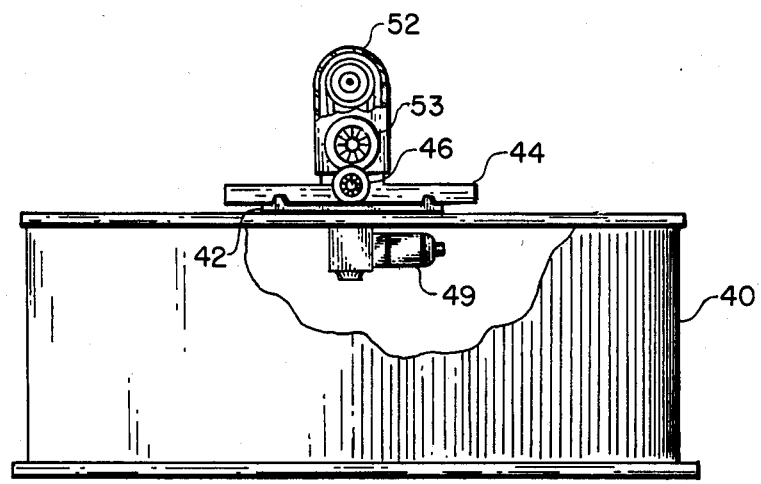
FIG. 3 is a right side elevation view of the same machine.

With reference to the accompanying drawings, a preferred embodiment of my invention of a method is shown which is particularly directed to the manufacture of universal joints of the type which incorporate components having spherical surfaces with common axes and centers of curvature. It will be observed that in these types of assemblies, corresponding and mating surfaces of the separate components must be machined to very close tolerances and conformity of shape in order to meet the requirements of the user.

Heretofore, the aforedescribed kinds of universal joints have been made by two types of methods. Single and low volume production has been accomplished by general purpose machines while large volume production has been on special purpose machines which perform single machining operations and generally incorporate multiple workheads.

With the instant invention the exacting machining operations for the spherical surfaces and ball grooves of the individual components are performed on common machines, referenced to common axes and generated about common centers without removing the workpieces. Thus, with my invention a single workhead is provided in combination with multiple tool heads on a common machine.

From the ensuing detailed description it will be noted that several noteworthy benefits are derived from the instant invention. The referencing of the machining for the spherical surfaces and ball grooves to common axes and the generation of surfaces without removing the workpiece results in improvements in conformity of corresponding and mating surfaces and control of product quality. Also, a single work station in combination with multiple machining stations facilitates control of product quality by providing common locating points for the workpiece in the workhead during machining operations and is readily adaptable to efficient and modern methods of automated production, such as, numerical or other systems of automated control. It will be further observed that the instant invention is highly versatile and may be employed as a single machine for prototype and low volume production or in numbers for high volume production.

In the drawings wherein like numerals refer to like and corresponding parts throughout the several views, the preferred embodiment is described in conjunction with a machine comprising a single work station 41 and a group of machining stations 39, preferably powered by electric motor drives, and mounted for rotation and translation on a base 40. The machine is universal in construction, whereby a wide range of sizes and types of universal joints can be machined by adjustments and minor modifications to the cutting tools and work holding devices thereof. The control of the machine may be manual or alternatively automatic by the use of a control system. Operator controls are located in the control unit 47 which is mounted to the base 40 by the support member 48. It will be observed that many features of the machine can be embodied in alternate constructions. For example, where the group of machining stations 39 is replaced by a single or group of demountable machining stations.

The work swivel table 42 is journaled to the base 40 is suitable bearings, not shown, for rotation about the vertical axis, designated by the numeral 80, and supported by the pair of bearing ring segments 43. The swivel table axis 80 is fixed in space and provides a reference axis for positioning a workpiece and for generating corresponding and mating surfaces of separate components of a particular design of a universal joint assembly. The swivel table 42 is power driven by the electric motor drive unit 49.

On top of and supported by the swivel table 42 is the work slide table 44 which is moveable in a direction perpendicular to the axis 80 of the swivel table 42. The work slide table 44, driven by the electric motor drive unit 46, is supported and guided by the pair of V-slide ways 45 or other suitable support and guide means.

Suitably mounted to the work slide table 44 is the workhead 50, comprising the spindle housing 51, spindle 55, spindle drive unit 52, spindle indexing unit 53, and work holding device 54. The spindle 55 is rotatably mounted within the spindle housing 51 on bearings, not shown, and during the operation of the machine may be either locked in position to the housing 51, indexed rotatably by the indexing unit 53 or continuously driven by the spindle drive unit 52. The spindle axis 38 intersects and is perpendicular to the swivel table axis 80, whereby during movement of the slide table 44 on the swivel table 42 the holding device 54 moves on the swivel table 42 along axis 38 in radial relationship to the axis 80 of the swivel table 42.

A workpiece 58 to be machined is carried in the holding device 54, shown as a conventional chuck 54, but which may alternatively be some other type of holding device, such as, a collet or arbor. The holding device 54 is operatively attached to one end of the spindle 55. At the other end of the spindle 55 is the indexing unit 53 which indexes the spindle 55 and attached holding device 54 about the spindle axis 38. The indexing unit 53 is operatively connected to the spindle 55 by a clutch means, not shown, and is operative only when the spindle 55 is not driven by the electric motor drive unit 52. When the spindle 55 is not driven by the drive unit 52 it is locked in position to the housing 51 by the clutch or some other locking means.

Opposite the work station 41 is the group of machining stations 39, comprising the spherical turning station 60, ball groove milling station 59, spherical grinding station 61 and ball groove grinding station 62. The machining stations 39 are mounted in fixed positions on the rotary index table 63 which is rotatable about the axis 37 disposed in a parallel and co-planar relationship to the axis 80 of the work swivel table 42. The rotary index table 63, suitably journaled and mounted to the cross slide table 65 in bearings, not shown, is driven by the electric motor indexing drive unit 64 whereby the separate machining stations 39 and their tools may be properly presented to the workpiece 58 during the machining thereof.

The cross slide table 65 is mounted on V-slide ways 66, or other suitable support and guide means, on the longitudinal slide table 68 and driven by the electric motor drive unit 67. The cross slide table 65 is oriented and moveable in a direction perpendicular to the axis 37 of the index table 63. The direction of movement of the cross slide table 65 is designated in the drawings by the arrows 36-36.

The longitudinal slide table 68 which underlies the cross slide table 65 is mounted on V-slide ways 69, or other suitable support and guide means, on the machine base 40. The table 68 is oriented and moveable in a direction perpendicular to the axis 37 of the index table 63 and driven by the electric motor drive unit 67 in the direction designated by the arrows 35-35. The directions 35-35 and 36-36 are perpendicular to each other.

Figure 4:
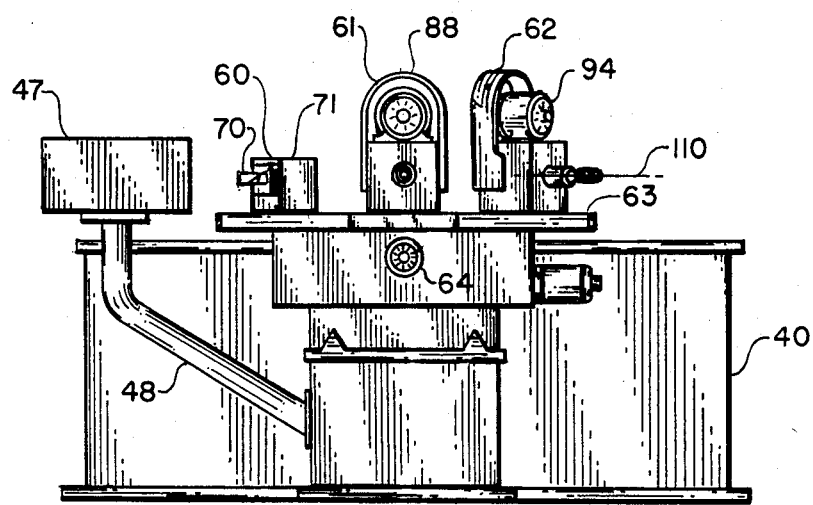
FIG. 4 is a left side elevation view of the same machine.
Figure 5:
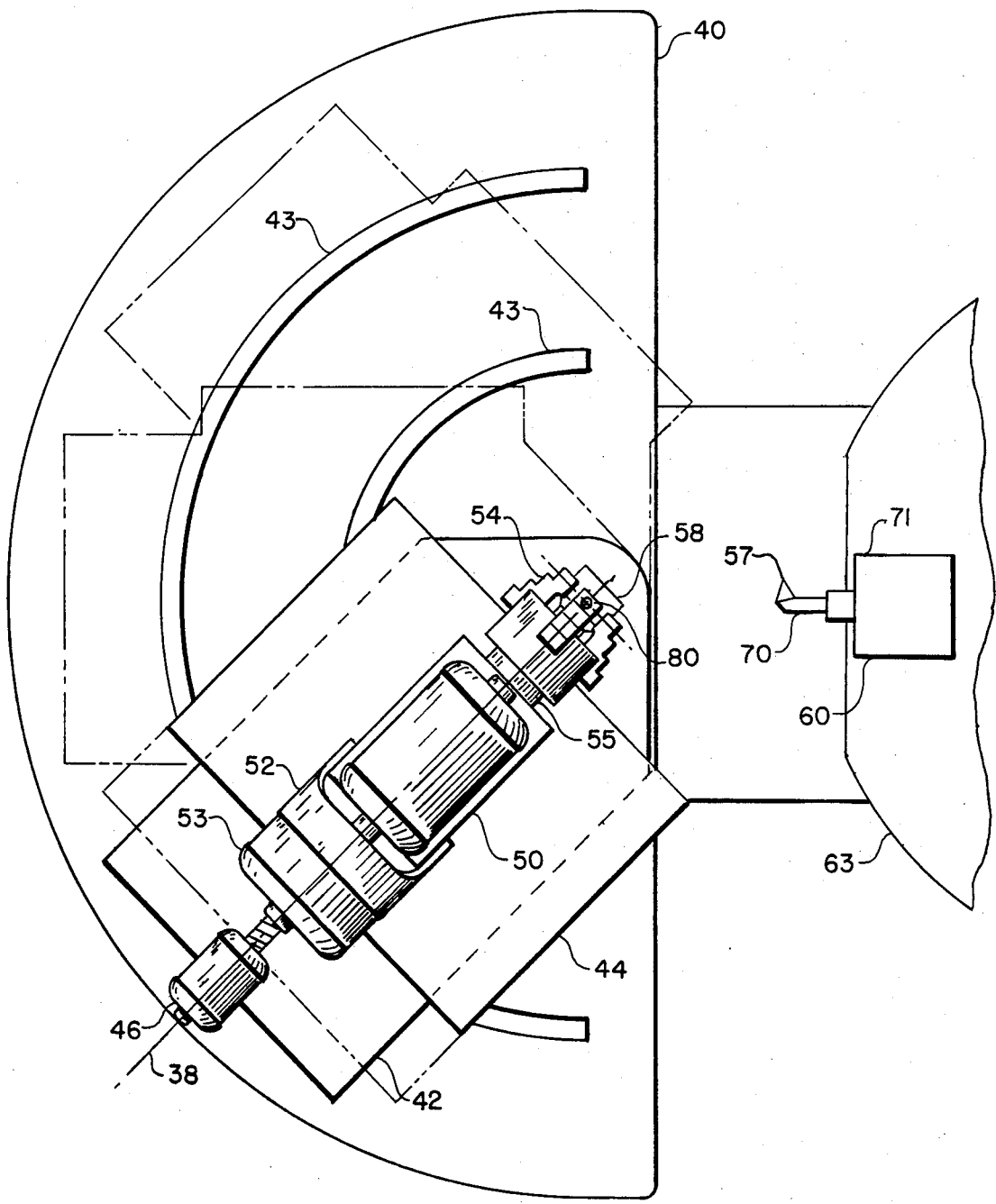
FIG. 5 is a partial plan view drawn to an enlarged scale from FIG. 1 depicting the relative positions of the work station and turning stations during a spherical turning operation of the machine.

Referring to FIG. 4, the spherical turning station 60 is comprised of the tool holder 71 fixed to the index table 63 and the replaceable cutter bit 70 held in the tool holder 71. The cutting edge 57 of the cutter bit 70 is positioned at the same height as the workhead spindle axis 38. Thus, during movements of the workpiece 58, the cutting edge 57 of the cutter bit 70 and workhead spindle axis 38 lie in the same plane and said plane is perpendicular to the swivel table axis 80 and index table axis 37. It will be later noted that the rotational axes of the tools of the milling station 59 and grinding stations 61, 62 are also located in this plane.

The cutter bit 70 is engaged with the workpiece 58 by indexing the table 63 to a position whereby the turning station 60 is opposite the workpiece 58 and then advancing the cutter bit 70 in the direction of the workpiece 58 by compound movements of the longitudinal slide 68 and cross slide 65 tables. The depth of cut of the cutter bit 70 is controlled by movement of the cross slide table 65.

Figure 6:
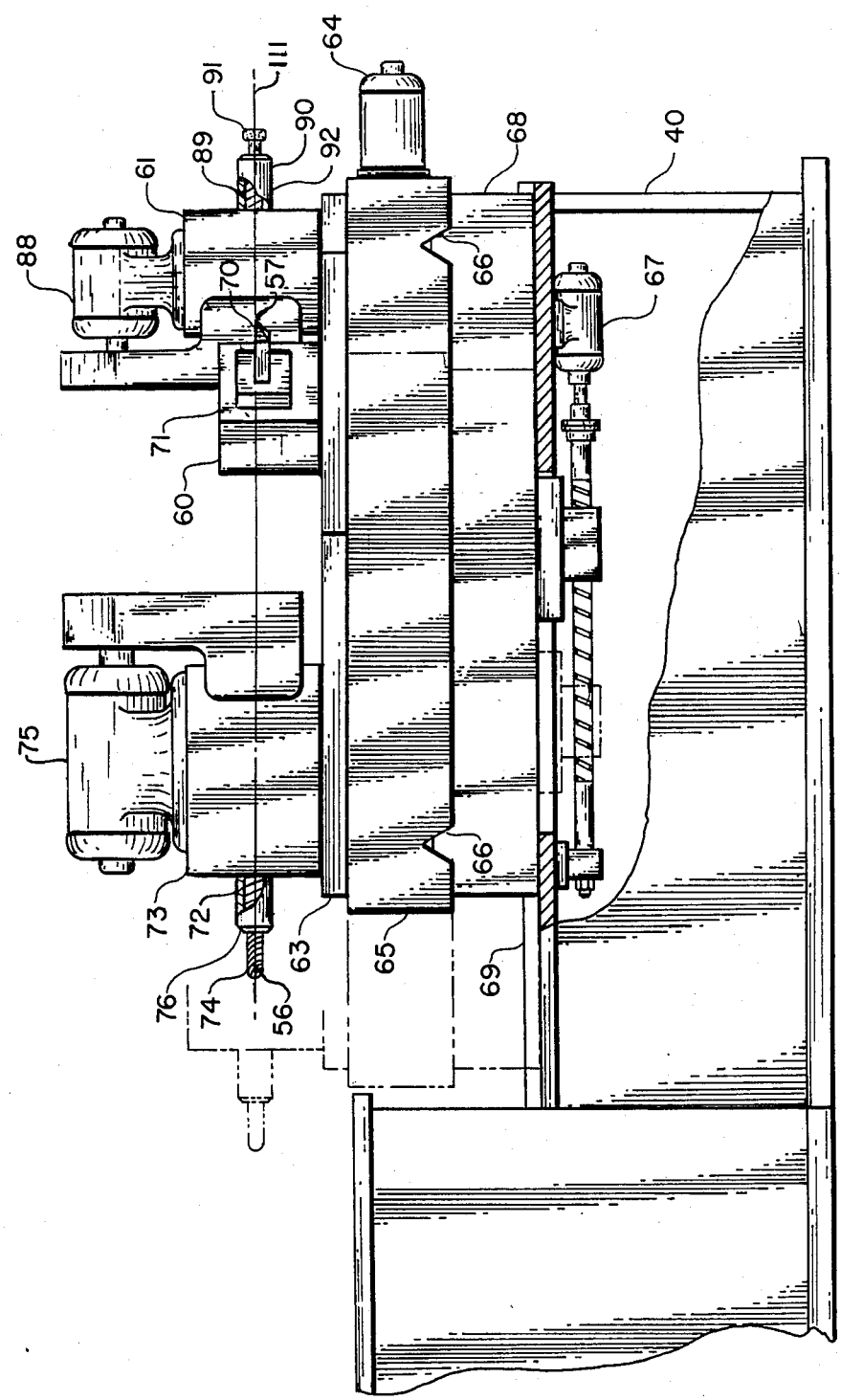
FIG. 6 is a partial front elevation view drawn to an enlarged scale from FIG. 2 depicting the relative positions of the work station and milling station during a spherical milling operation of the machine.

The construction of the ball groove milling station 59 is best observed in FIG. 6. The horizontally disposed milling spindle 72 is suitably journaled within bearings, not shown, in the housing 73 and rotatably driven by the electric motor drive unit 75. The housing 73 is fixed to the index table 63. At the outer end of the spindle 72 is the holding device 76 which carries the milling cutter 74. The rotational axis 56 of the milling cutter 74 is positioned at the same height as the workhead spindle axis 38, co-planar with the spindle axis 38 and perpendicular to the swivel table axis 80.

Referring to FIG. 1, the spherical grinding station 61 includes the spindle housing 92 fixed to the index table 63, the horizontally disposed spindle 89 suitably journaled in bearings, not shown, within the housing 92, the tool holder 90 aligned with and attached to the outer end of the spindle 89, and grinding tool 91 and the electric motor drive unit 88 for rotating the spindle 89.

The spherical end of the grinding tool 91 is shaped and sized to produce the finished profile of the spherical race of a joint member. Preferably, with the object of minimizing the requirement for replacement and dressing of the grinding tool 91, an abrasive material having high wear resistance is used for the tool 91. An example of a commercially available material with high wear resistance is the abrasive marketed under the tradename Borazon. The horizontal rotational axis 111 of the spindle 89 and thereby the grinding tool 91 are at the same height as the workhead spindle axis 38, thus lying in the same plane as the workhead spindle axis 38 and perpendicular to the swivel table axis 80.

The construction of the ball groove grinding station 62 is similar to the spherical grinding station 61, except for the speed ratio of the electric motor drive unit 94 which provides the proper surface speed for grinding the ball grooves, and preferably the shape of the grinding tool 97. The spindle 95 is suitably journaled within bearings, not shown, in the housing 96 which is fixed to the index table 63. The tool holder 98 which is aligned with and attached to one end of the spindle 95 carries the ball groove grinding tool 97, the axis 110 of the grinding tool 97 also being the axis of the spindle 95. The electric motor drive unit 94 is attached to the other end of the spindle 95.

The horizontal rotational axis 110 of the ball groove grinding spindle 89 is at the same height as the workhead spindle axis 38 thereby lying in the same plane as the workhead spindle axis 38 and perpendicular to the swivel table axis 80. An abrasive material with high wear resistance is also preferred for the ball groove grinding tool 97.

In applying the present invention it will be observed that in order to achieve the exacting tolerances which are required for the separate members of a universal joint, the machine herein described must be constructed with care and accuracy such that the cutting edge 57 of the cutter bit 70, and rotational axes of the milling cutter 74 and grinding tools 91, 97 are positioned at the same height and lie in the same plane as the axis 38 of the workhead spindle 55. It will also be observed that the foregoing condition must be met during the aforedescribed motions of the other members, such as, the work swivel table 42 of the machine.

The following description of spherical and ball race machining of a set of universal joint components further describes the features and use of the present invention.

Figure 7:
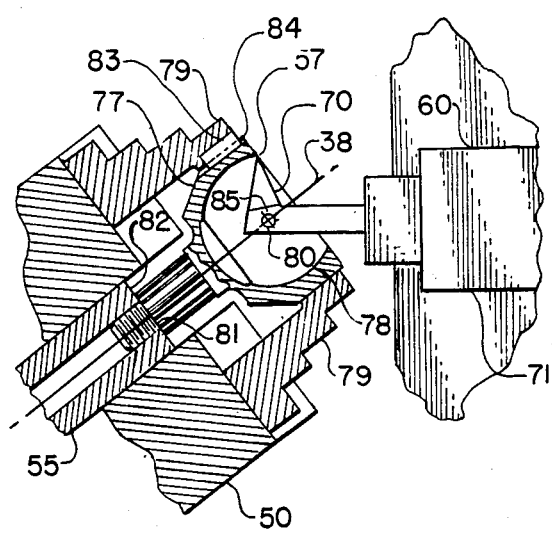
FIGS. 7 and 8 are horizontal sectional views taken along the line 7—7 of FIG. 1, drawn to an enlarged scale and depicting spherical I.D. turning of a universal joint outer race.
Figure 8:
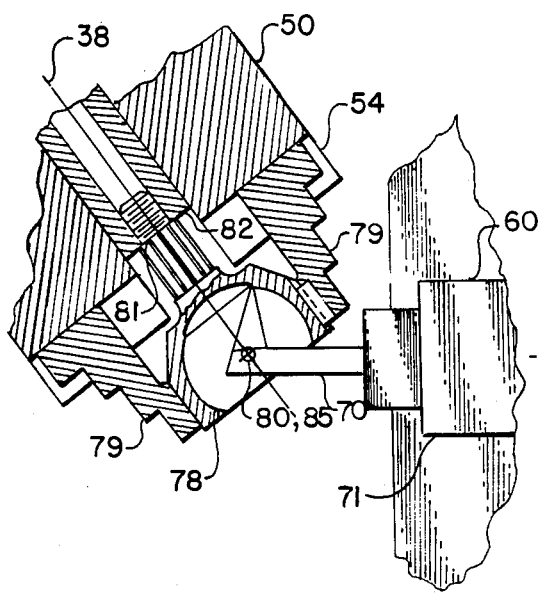

Referring to FIGS. 7 and 8, the outer member 77 of a Rzeppa type universal joint is shown in the workhead 50 during spherical turning of the outer race 78. The workpiece 77 is accurately located in the workhead 50 by clamping the outer diameter of the workpiece 77 in the jaws 79 of the holding device 54, butting the shoulder 81 of the workpiece 77 against the shoulder stop 82 of the workhead 50 and engaging the key 83 of the holding device 54 with the keyway 84 of the workpiece 77. Thus, it is seen that the workpiece 77 has been accurately aligned and positioned in axial and radial directions with respect to the axis 38 of the workhead spindle 55.

In FIG. 7 the positions of the workhead 50 and turning station 60 are shown at the beginning of spherical I.D. turning of the outer race 78. As will be observed, the workhead 50 has been revolved about the swivel table axis 80 and the cutter bit 70 engaged with the workpiece 77 by advancing the longitudinal slide table 68 and then moving the cross slide table 65 to set the depth of cut. During spherical turning, the workpiece 77 is rotatably driven by the drive unit 52 about the work spindle axis 38 and swiveled by the swivel table 42 about the table axis 80 to the final position shown in FIG. 8. If necessary, further cuts are taken in the aforedescribed manner to complete the turning of the outer race 78.

After spherical turning the outer race 78, the cutter bit 70 is withdrawn from the workpiece 77 by movements of the cross slide 65 and longitudinal slide 68 tables. The spindle 55 is positioned by the indexing unit 53 and lodged in place to prepare for the next operation of milling the ball grooves 87 of the workpiece 77. It will be observed that for ball groove milling the workpiece 77 is not removed from the holding device 54 used for spherical turning.

Figure 9:
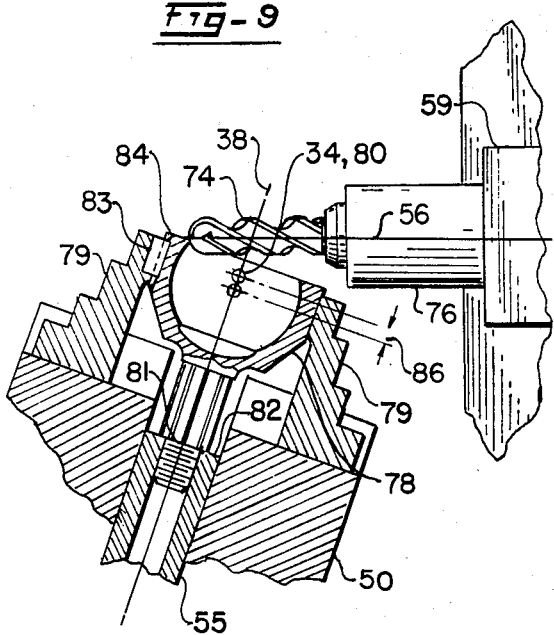
FIGS. 9 and 10 are similar views to FIGS. 7 and 8 depicting milling of a ball groove in a universal joint outer race.

Referring now to FIG. 9 wherein the initial positions of the workpiece 77 and milling cutter 74 are shown for ball groove milling, the workpiece 77 is initially positioned by swiveling the table 42 and displacing the work slide table 44 from the position used for spherical turning in an amount equal to the offset 86 in the workpiece 77 between the center of curvature 85 of the outer race 78 and the center 34 of the meridians of the ball grooves 87. Thus, the workpiece 77 has been re-positioned to place the center 34 of the meridians of the ball grooves 87 to be machined on the axis 80 of the work swivel table 42. The milling station 59 is moved opposite the workpiece 77 by indexing the rotary table 63 and the milling cutter 74 engaged with the workpiece 77 by advancing the longitudinal slide table 68 and then moving the cross slide table 65 to set the depth of the milling cut.

Figure 10:
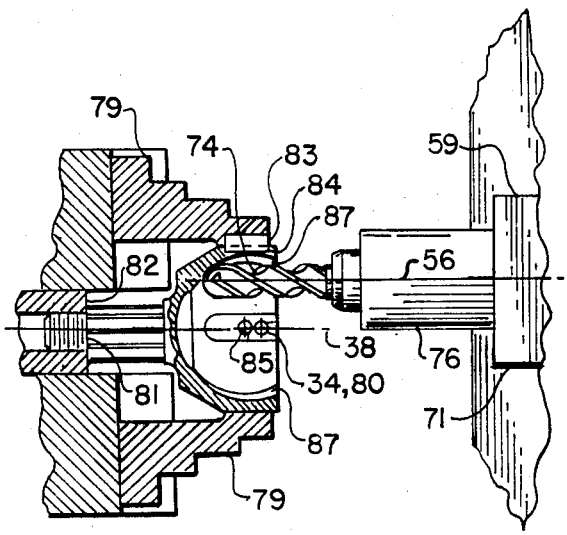

During the milling of a ball groove 87, the milling cutter 74 is rotatably driven by the drive unit 75 as the workpiece 77 is swiveled by the table 42 about the table axis 80 to the final position shown in FIG. 10. If necessary, further milling is done in the aforedescribed manner to complete the ball groove 87. After the ball groove 87 has been completed, the milling cutter 74 is withdrawn from the workpiece 77, by a movement of the longitudinal slide table 68, and the workpiece 77 is rotatably indexed by the indexing unit 53 for milling the next ball groove 87. The spindle 55 is then locked to the housing 51, the milling cutter 74 re-engaged with the workpiece 77 and the next ball groove 87 milled in the aforedescribed manner. The sequence is repeated for the remaining ball grooves 87.

Following ball groove milling, the workpiece 77 is preferably removed from the holding device 54 and heat treated. After heat treating, the workpiece is remounted in the same position in the holding device 54 with the help of the key 83 for grinding the outer race 78 and ball grooves 87 to their finished sizes.

Figure 11:
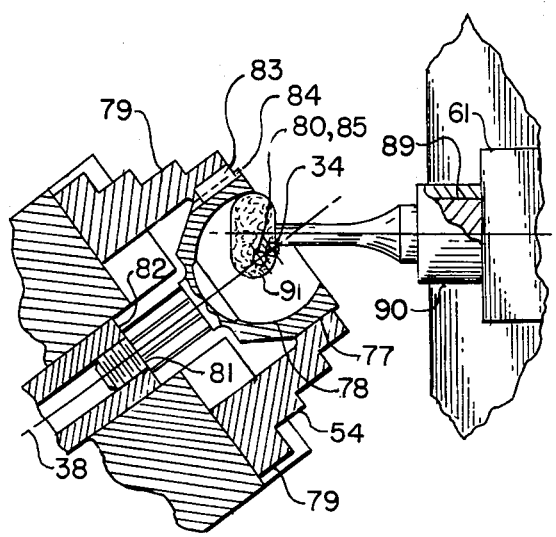
FIGS. 11 and 12 are similar views to FIGS. 7 and 8 depicting spherical I.D. grinding of a universal joint outer race.

Referring to FIG. 11, the workpiece 77 and spherical grinding tool 91 are shown at their initial positions for the operation of spherical grinding the outer race 78. The workpiece 77 is initially positioned by swiveling the table 42 and displacing the work slide table 44 to place the center of curvature 85 of the outer race 78 on the axis 80 of the swivel table 42. The position of the work slide table 44 for spherical grinding is the same as for spherical turning. The grinding station 61 is moved opposite the workpiece 77 by indexing the rotary table 63 and the grinding tool 91 engaged with the workpiece 77 by advancing the longitudinal slide table 68 and moving the cross slide table 65 to set the depth of the grind.

Figure 12:
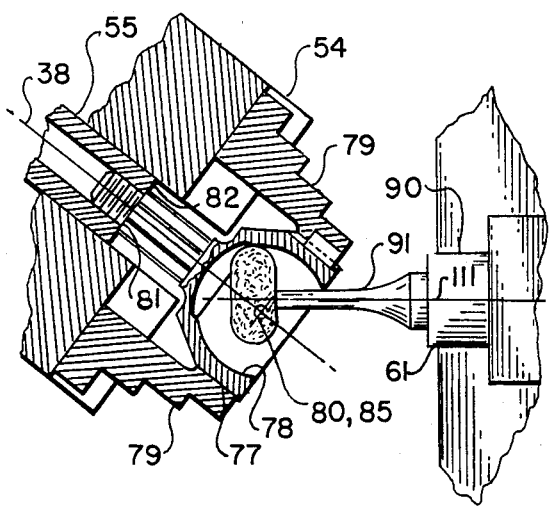

During spherical grinding of the outer race 78, the grinding tool 91 is rotated by the drive unit 88 as the workpiece 77 is rotatably driven by the drive unit 52 about the work spindle axis 38 and swiveled by the table 42 about the table axis 80 to the final position shown in FIG. 12. If necessary, further grinding is done in the aforedescribed manner for the finished size of the outer race 78. The grinding tool 91 is then withdrawn from engagement with the workpiece 77 by movements of the cross slide table 65 and longitudinal slide table 68 to begin the next operation of grinding the ball grooves 87 to their finished sizes.

After spherical grinding the outer race 78, the spindle 55 is positioned by the indexing unit 53 and locked in place to prepare for the next operation of ball groove grinding. The work slide table 44 is then returned to the same position as ball groove milling whereby the center 34 of the ball groove meridians is on the axis 80 of the work swivel table 42.

Figure 13:
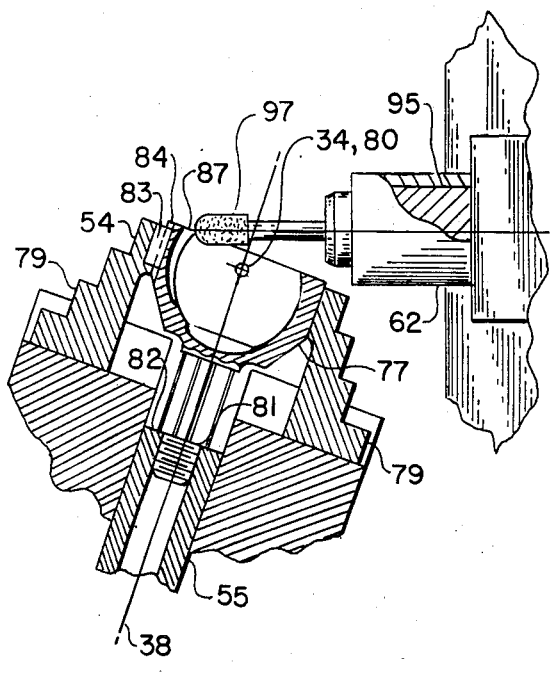
FIGS. 13 and 14 are similar views to FIGS. 7 and 8 depicting grinding of a ball groove in a universal joint outer race.
Figure 14:
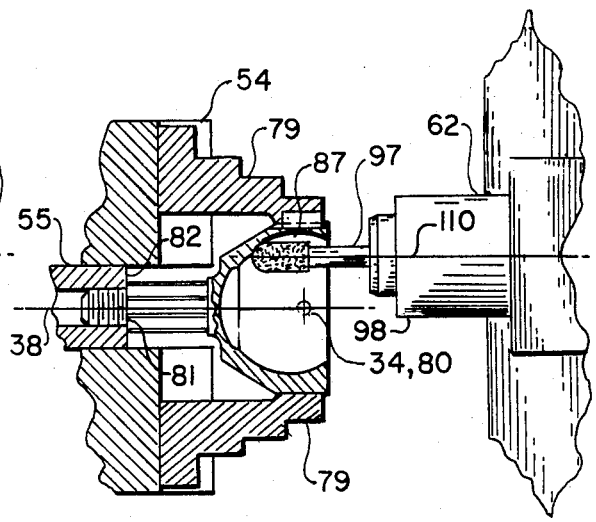

Referring now to FIG. 13, the initial positions of the workpiece 77 and ball groove grinding tool 97 are shown for ball groove grinding. The workpiece 77 is swiveled about the axis 80 by the swivel table 42 and the ball groove grinding station 62 brought into position by indexing the rotary table 63. The grinding tool 97 is engaged with the ball groove 87 of the workpiece 77 by advancing the longitudinal slide table 68 and moving the cross slide table 65 to set the depth of the grind. During grinding, the grinding tool 97 is rotatably driven by the drive unit 94 as the workpiece 77 is swiveled by the table 42 about the table axis 80 to the final position shown in FIG. 14. If necessary, further grinding is done in the aforedescribed manner to finish the ball groove 87. The grinding tool 97 is then withdrawn from engagement with the workpiece 77, by movements of the cross slide table 65 and longitudinal slide table 68, and the workpiece 77 is rotatably indexed by the indexing unit 53 about the axis 38 to the position of the next ball groove 87. The spindle 55 is then locked to the housing 51, the grinding tool 97 re-engaged with the workpiece 77 and the next ball groove 87 ground in the aforedescribed manner. The sequence is repeated for the remaining ball grooves 87.

Figure 15:
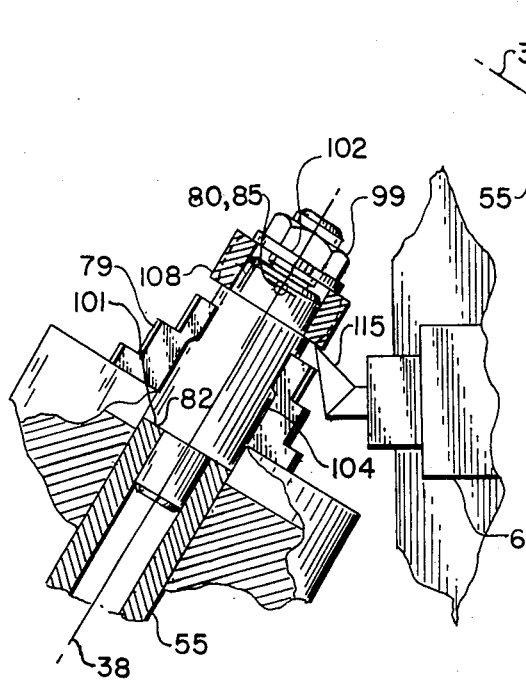
FIGS. 15 and 16 are similar views to FIGS. 7 and 8 depicting spherical O.D. turning of a universal joint ball cage.
Figure 16:
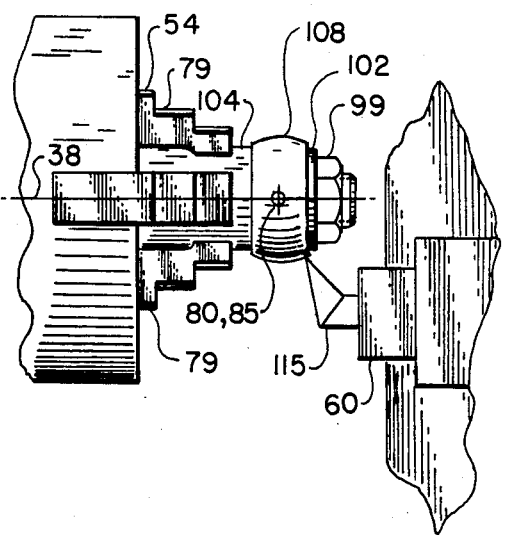

Referring to FIGS. 15 and 16, the finished outer member 77 has been removed from the machine and the ball cage member 108, supported on the arbor 104, mounted in the workholder 54. The operation to be performed is spherical O.D. turning of the workpiece 108. It will be observed after the subsequent grinding of the workpiece 108 that the finished outer contour of ball cage member 108 conforms to the contour of the outer race 78 of the outer member 77.

The workpiece 108 is clamped to the end portion of the arbor 104 by the washer 102 and clamp nut 99 which is in threaded engagement with the arbor 104. The arbor 104 is aligned with the spindle 55 by the jaws 79 of the workholder 54 and located in the direction of the spindle axis 38 by butting the arbor shoulder 101 against the workhead shoulder stop 82. The construction of the arbor 104 preferably positions the center of curvature 85, of the surface to be machined, on the swivel table axis 80 when the work slide table 44 is positioned at the same location used during spherical machining of the outer race 78 of the member 77.

The workpiece 108 is initially positioned as shown in FIG. 15 by swiveling the table 42 about the table axis 80 and moving the work slide table 44 to position the center of curvature 85 of the surface to be machined onto the swivel table axis 80. The turning station 60 is then moved into position by indexing the rotary table 63 and the cutter bit 115 engaged with the workpiece 108 by advancing the longitudinal slide table 68 and then moving the cross slide table 65 to set the depth of cut of the cutter bit 115. During spherical turning, the workpiece 108 is rotatably driven by the drive unit 52 about the spindle axis 38 and swiveled by the table 42 about the table axis 80 to the final position shown in FIG. 16. If necessary, further cuts are taken in the aforedescribed manner to size the spherical O.D. of the workpiece 108.

Figure 17:
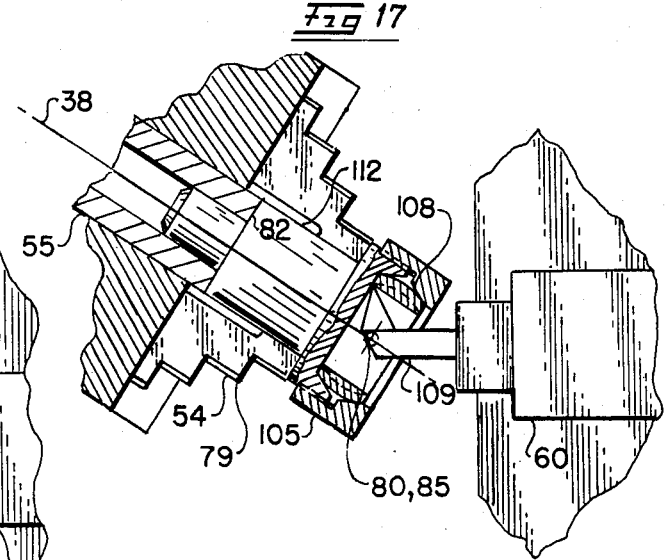
FIGS. 17 and 18 are similar views to FIGS. 7 and 8 depicting spherical I.D. turning of a universal joint ball cage.
Figure 18:
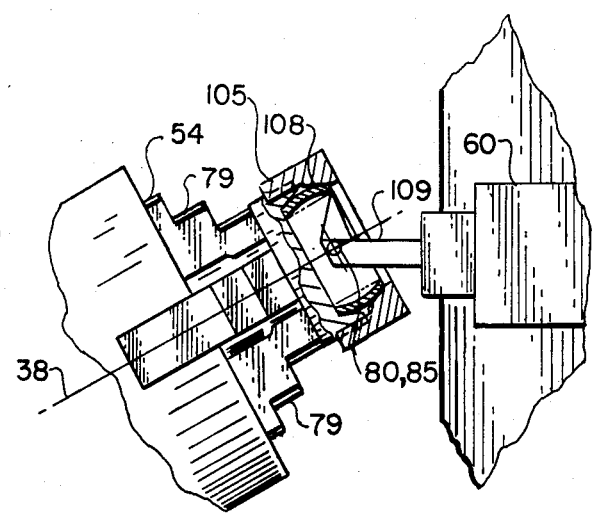

Referring to FIGS. 17 and 18, the workpiece 108 has been removed from the arbor 104 and mounted on the arbor 112 which is carried in the workholder 54. The interior of the arbor 112 is shaped to receive the outer contour of the workpiece 108 and the workpiece 108 is clamped to the arbor 112 by the clamp nut 105 which is in threaded engagement with the end portion of the arbor 112. An alternative means, not shown, for holding the workpiece 108 during spherical I.D. turning and grinding is unhardened chuck jaws having a conforming contour for clamping the workpiece 108 within the jaws. It is apparent that with the alternative holding method the conforming contour can be machined in unhardened jaws of the workholder 54 by the use of the present invention.

The workpiece 108 is initially positioned as shown in FIG. 17 by swiveling the table 42 about the table axis 80 and moving the work slide table 44, if necessary, to position the center of curvature 85 of the inner surface to be machined on the swivel table axis 80. The turning station 60 is moved into position by indexing the rotary table 63 and the cutter bit 109 engaged with the workpiece 108 by advancing the longitudinal slide table 68 and moving the cross slide table 65 to set the depth of cut of the cutter bit 109. The workpiece 108 is then swiveled about the axis 80 by the swivel table 42 and rotatably driven about the spindle axis 38 by the drive unit 52 to the final position shown in FIG. 18. If necessary, further cuts are taken in the aforedescribed manner to complete the spherical I.D. turning of the workpiece 108.

Following the spherical I.D. turning, the workpiece 108 is preferably removed from the arbor 112 and holding device 54 for machining the ball slots in the workpiece 108 and heat treating. After these operations are completed, the workpiece 108 is returned to the machine for grinding the spherical outer and inner surfaces to their finished sizes.

Figure 19:
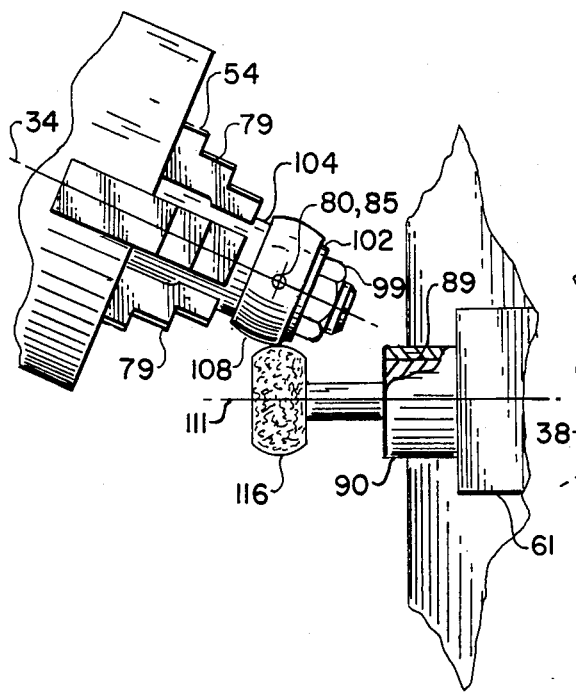
FIGS. 19 and 20 are similar views to FIGS. 7 and 8 depicting spherical O.D. grinding of a universal joint ball cage.
Figure 20:
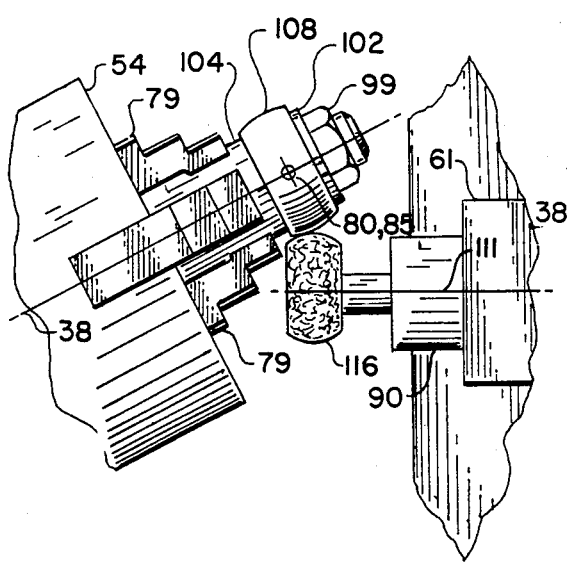

Referring now to FIG. 19, the workpiece 108 and grinding tool 116 are shown in their initial positions for spherical O.D. grinding of the ball cage member 108. The workpiece 108 has been re-mounted on the arbor 104 which is carried in the workholder 54. The workpiece 108 is initially positioned by swiveling the table 42 and displacing the work slide table 44 to place the center of curvature 85 of the outer surface on the axis 80 of the swivel table 42. The grinding station 61 is brought into position by indexing the rotary table 63 and the grinding tool 116 engaged with the workpiece 108 by advancing the longitudinal slide table 68 and moving the cross slide table 65 to set the depth of cut of the grinding tool 116. The grinding tool 116 is rotatably driven by the drive unit 88 as the workpiece 108 is rotatably driven by the drive unit 52 and swiveled by the table 42 about the axis 80 to the final position shown in FIG. 20. If necessary, further grinding is done in the aforedescribed manner to complete the spherical O.D. grinding of the workpiece 108.

Figure 21:
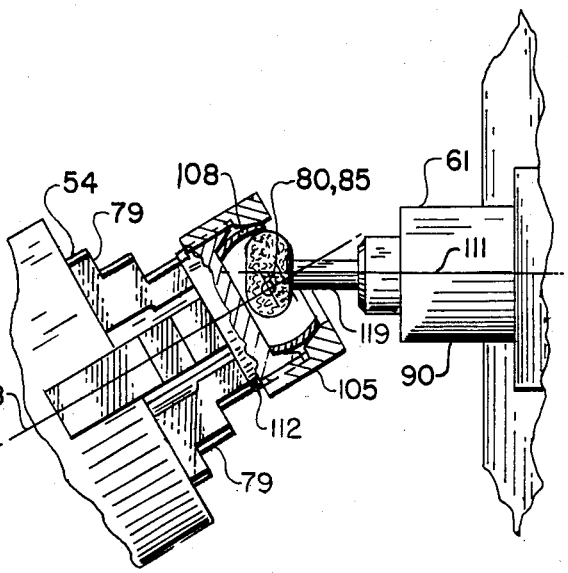
FIGS. 21 and 22 are similar views to FIGS. 7 and 8 depicting spherical I.D. grinding of a universal joint ball cage.
Figure 22:
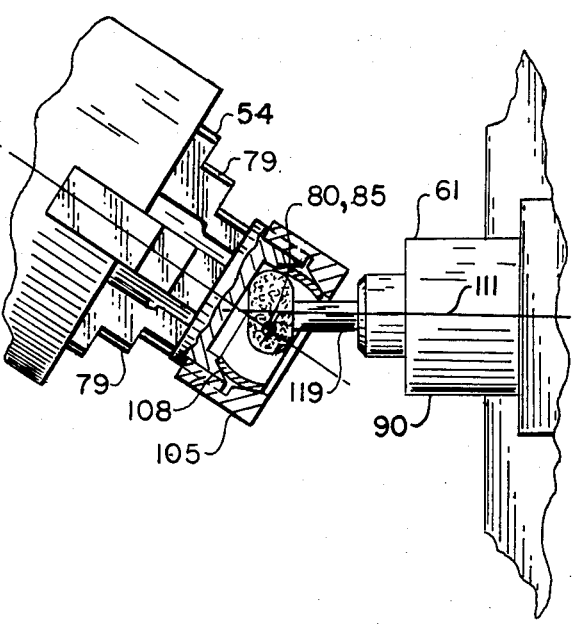

After the spherical O.D. grinding has been completed, the workpiece 108 is transferred to the arbor 112 which was previously used for spherical I.D. turning and mounted with the arbor 112 in the workholder 54 for spherical I.D. grinding. The initial positions of the workpiece 108 and grinding tool 119 are shown in FIG. 21. The workpiece 108 is initially positioned by swiveling the table 42 about the axis 80 and moving the work slide table 44, if necessary, to position the center of curvature 85 of the inner surface on the axis 80 of the swivel table 42. In the event the grinding station 61 has been moved from the position of spherical O.D. grinding, it is returned opposite the workpiece 108 by indexing the rotary table 63. The grinding tool 119 is then engaged with the workpiece 108 by advancing the longitudinal slide table 68 and moving the cross slide table 65 to set the depth of grind of the tool 119. The grinding tool 119 is rotatably driven by the drive unit 88 as the workpiece 108 is rotatably driven by the drive unit 52 and swiveled by the table 42 about the table axis 80 to the final position shown in FIG. 22.

Figure 23:
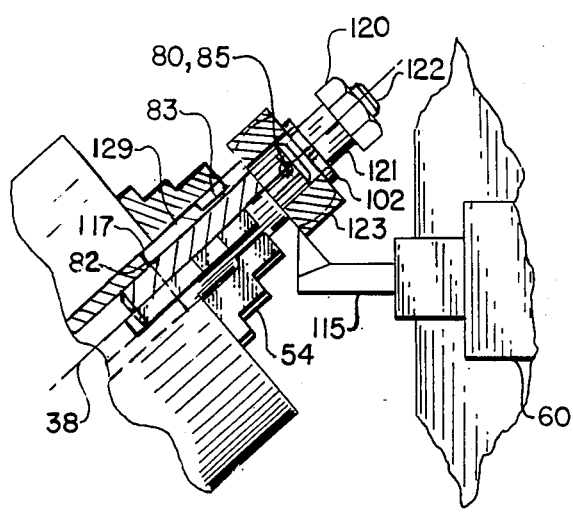
FIGS. 23 and 24 are views similar to FIGS. 7 and 8 depicting spherical O.D. turning of a universal joint inner race.
Figure 24:
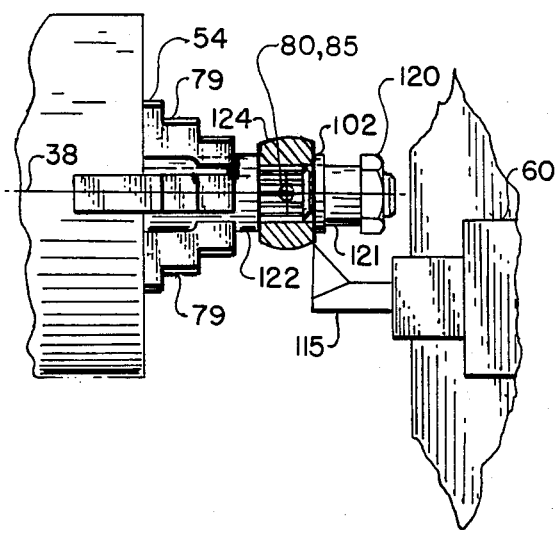

Referring now to FIGS. 23 and 24, the ball cage member 108 has been removed from the machine and the inner member 123 carried on the arbor 122 mounted in the workholder 54. The operation to be performed on the workpiece 123 is spherical O.D. turning of the inner race 124. The workpiece 123 is clamped to the end portion of the arbor 122 by the spacer 121 and clamp nut 120 which is in threaded engagement with the end of the arbor 122. The center portion of the arbor is splined to receive the internal spline of the workpiece 123. The workpiece 123 is angularly located on the arbor 122 by some means, not shown, such as engaging a wide tooth of the arbor spline with a wide space of the workpiece spline. The arbor 122 is preferably constructed to position the center of curvature 85, of the inner race 124 to be machined, on the swivel table axis 80 when the work slide table 44 is positioned at the same location used during spherical machining of the outer race 78 of the member 77. The arbor 122 is located within the workhead 50 by the chuck jaws 79, engaging the key 83 of the holding device 54 with the keyway 129 of the arbor 122 and butting the shoulder 117 of the workpiece 123 against the shoulder stop 82 of the workhead 50.

The workpiece 123 is initially positioned by swiveling the table 42 about the axis 80 and moving the work slide table 44 to position the center of curvature 85 of the inner race 124 to be machined on the axis 80 of the swivel table 42. The turning station 60 is moved into position by indexing the rotary table 63 and the cutter bit 125 engaged with the workpiece 123 by advancing the longitudinal slide table 68 and moving the cross slide table 65 to set the depth of cut of the cutter bit 125. During O.D. turning of the inner race 124, the workpiece 123 is rotatably driven about the work spindle axis 38 by the drive unit 52 and swiveled about the axis 80 of the table 42. If necessary, further cuts are taken to complete the turning of the inner race 124. The final position after O.D. turning is shown in FIG. 24. The cutter bit 125 is then withdrawn from the workpiece 123 by movements of the cross slide table 85 and longitudinal slide table 68 to begin the next operation of milling the ball grooves 127.

Figure 25:
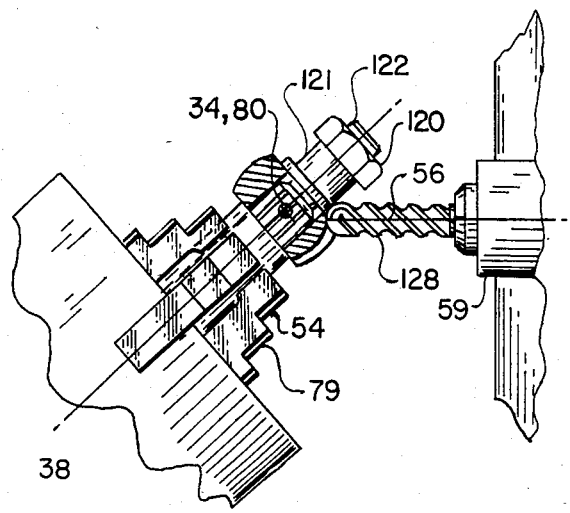
FIGS. 25 and 26 are views similar to FIGS. 7 and 8 depicting milling of a ball groove in a universal joint inner race.

The initial positions of the workpiece 123 and milling tool 128 are shown in FIG. 25 for ball groove milling. The workpiece 123 is initially positioned by swiveling the table 42 about the axis 80 and moving the work slide table 44 to position the center 34 of the meridians of the ball grooves 127 to be machined on the axis 80 of the swivel table 42. It will be observed that the same arbor 122 and workholder 54 is used for machining the inner race 124 and ball grooves 127 of the inner member 123 without removing the workpiece 123.

Figure 26:
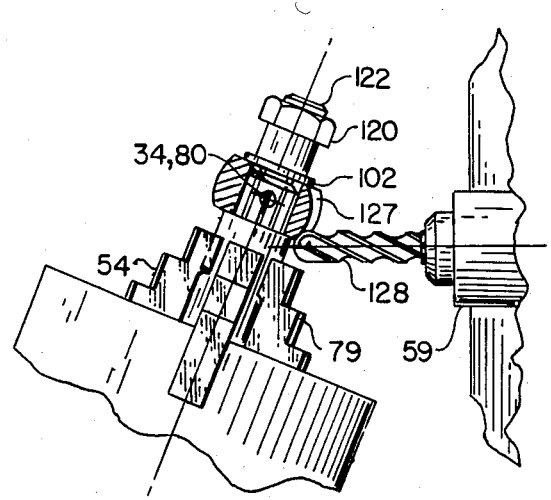

The milling station is moved into position by indexing the rotary table 63 and the milling cutter 128 is engaged with the workpiece 123 by advancing the longitudinal slide table 68 and moving the cross slide table 65 to set the depth of cut of the milling cutter 128. The work spindle 55 is locked in position to the spindle housing 51 during the milling of a ball groove 127. The milling cutter 128 is rotatably driven by the drive unit 75 as the workpiece 123 is swiveled by the table 42 about the table axis 80 to the final position shown in FIG. 26. If necessary, further milling cuts are taken in the aforedescribed manner to complete the milling of the ball groove 127. After the groove 127 has been completed, the milling cutter 128 is withdrawn from engagement with the workpiece 123 by movements of the cross slide table 65 and longitudinal slide table 68 and the workpiece 123 is rotatably indexed by the indexing unit 53 to position the workpiece 123 for milling the next ball groove 127. The sequence is repeated for the remaining ball grooves 127.

Following the milling of the ball grooves 127, the workpiece 123 is preferably removed from the machine and heat treated. After heat treating the workpiece 123 is re-mounted in the arbor 122 carried in the workholder 54 for grinding the inner race 124 and ball grooves 127 of the workpiece 123.

Figure 27:
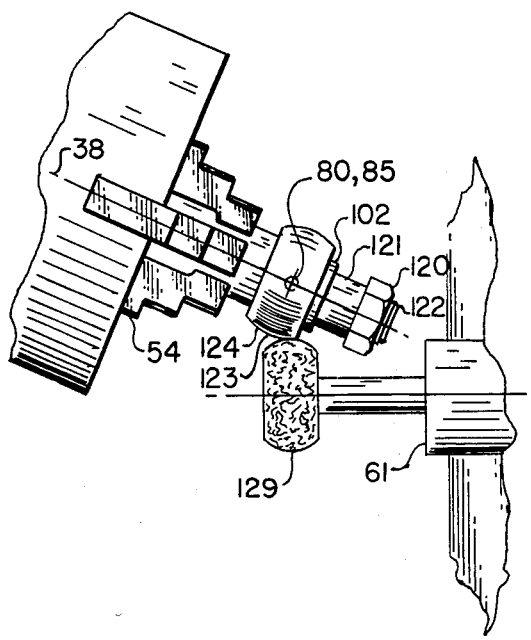
FIGS. 27 and 28 are views similar to FIGS. 7 and 8 depicting spherical O.D. grinding of a universal joint inner race.
Figure 28:
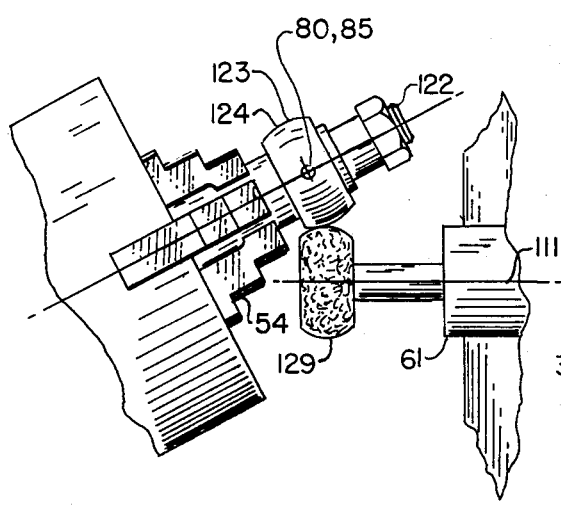

Referring now to FIG. 27, the workpiece 123 and grinding tool 129 are shown in their initial positions spherical grinding of the inner race 124. The workpiece 123 is initially positioned in the same manner as during spherical turning whereby the workpiece 123 is swiveled by the table 42 about the axis 80 and the work slide table 44 is moved to position the center of curvature 85 of the inner race 124 on the axis 80 of the swivel table 42. The grinding tool 129 is engaged with the workpiece 123 by advancing the longitudinal slide table 68 and moving the cross slide table 65 to set the depth of the grinding cut. During spherical grinding, the grinding tool 129 is rotatably driven by the drive unit 88 while the workpiece 123 is rotatably driven about the axis 38 by the drive unit 52 and is swiveled by the table 42 about the table axis 80 to the position shown in FIG. 28. If necessary, further grinding is done in the aforedescribed manner to complete the spherical grinding of the inner race 124.

Figure 29:
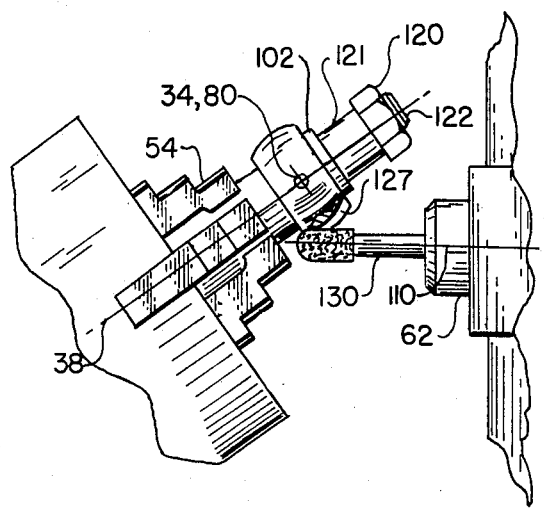
FIGS. 29 and 30 are views similar to FIGS. 7 and 8 depicting grinding of a ball groove in a universal joint inner race.
Figure 30:
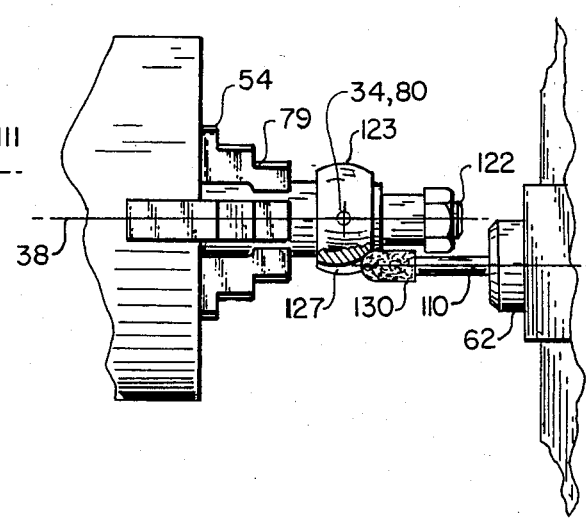

The initial positions of the workpiece 123 and ball groove grinding tool 130 are shown in FIG. 29 for the operation of grinding ball grooves 127 of the inner member 123. The workpiece 123 is initially positioned by swiveling the table 42 about the table axis 80 and moving the work slide table 44 to position the center 34 of the meridians of the ball grooves 127 on the axis 80 of the swivel table 42. The grinding station 62 is brought into position by indexing the rotary table 63 and the grinding tool 130 engaged with the workpiece 123 by advancing the longitudinal slide table 68 and moving the cross slide table 65 to set the depth of the grind. The work spindle 55 is positioned by the indexing unit 53 and locked in place to position a ball groove 127 for finished grinding. During ball groove grinding, the grinding tool 130 is rotatably driven by the drive unit 94 as the workpiece 123 is swiveled by the table 42 about the axis 80 to the final position shown in FIG. 30. If necessary, further grinding is done in the aforedescribed manner to complete the ball groove 127. The grinding tool 130 is then withdrawn from engagement with the workpiece 123, by a movement of the longitudinal slide table 68, and the workpiece 123 rotatably indexed by the indexing unit 53 to the position of the next ball groove 127. The spindle 55 is then locked in position to the housing 51, the grinding tool 130 re-engaged with the workpiece 123 and the next ball groove 127 ground in the aforedescribed manner. The sequence is repeated for the remaining ball grooves 127.

From the foregoing detailed description, it is apparent that the instant invention provides a method which is particularly adapted to the manufacture of universal joints and has numerous features and advantages, such as, reduced investment costs, adaptability to automated systems of production, and improved maintenance of tolerances, fit and conformity of the separate members of a joint assembly. It is also apparent from among the numerous advantages of the invention, that a wide range of sizes and types of universal joints can be machined with the invention by adjustments, modifications to the cutting tools and work holding devices and variations in the motions of the elements thereof.

Although but a single embodiment of the invention has been described in detail, it is obvious that many changes may be made in the size, shape, arrangement and details of the various elements of the invention without departing from the spirit thereof.

I claim:

1. A method for manufacturing universal joints of the type employing conjugate members having close fitting conforming surfaces comprising mounting each of the conjugate members in a common workhead during the machining thereof, imparting the same relative motions between the conjugate members and cutting tools as exist during the actual service of the members, engaging the cutting tools with the members and generating the close fitting conforming surfaces of the members by the cutting actions of the tools.

2. A method for manufacturing universal joints of the type employing conjugate members having close fitting conforming surfaces comprising:
   (a) mounting a workpiece for machining one member of a universal joint assembly in a workhead;
   (b) swiveling the workpiece about an axis;
   (c) engaging a machining tool with the swiveling workpiece in a manner such that a curved surface having a center of curvature on said axis is generated by the cutting action of said tool;
   (d) disengaging the tool from the workpiece;
   (e) de-mounting the workpiece from the workhead;
   (f) mounting a second workpiece for machining a conjugate member of the universal joint assembly in the same workhead in a manner such that the center of curvature of a curved surface to be machined in said second workpiece is coincident with the center of curvature of the first workpiece during the machining thereof;
   (g) swiveling the second workpiece about the same axis as the first workpiece;
   (h) engaging a machining tool with the swiveling second workpiece in a manner such that a curved surface, which is close fitting and conforming to a surface of a mating member of the universal joint assembly, is generated by the machining action of said tool;
   (i) disengaging the tool from the second workpiece; and
   (j) de-mounting the second workpiece from the common workhead.

3. The method of manufacturing universal joints recited in claim 2 wherein the tools for generating the close fitting and conforming spherical surfaces are turning tools.

4. The method of manufacturing universal joints recited in claim 2 wherein the tools for generating the close fitting and conforming spherical surfaces are grinding tools.

5. The method of manufacturing universal joints recited in claim 2 wherein the tools for generating the close fitting and conforming spherical surfaces are milling tools.

6. The method of manufacturing universal joints recited in claim 2 further comprising the step of indexing said first workpiece about a second axis which is in perpendicular and intersecting relationship to the first said axis after said workpiece is mounted in the common workhead and the step of indexing said second workpiece about the same axis after said second workpiece is mounted in said workhead.

7. The method of manufacturing universal joints recited in claim 2 wherein said first and second workpieces are rotated about a second axis which is in perpendicular and intersecting relationship to the first said axis during the same time said workpieces are swiveled about said first axis.

8. A method for manufacturing universal joints of the type employing conjugate members having close fitting conforming surfaces comprising:
   (a) mounting a workpiece for machining a joint member in a common workhead;
   (b) revolving the workpiece about an axis;
   (c) swiveling the rotating workpiece about a second axis which is in perpendicular and intersecting relationship to the first said axis;
   (d) engaging a machining tool with the revolving and swiveling workpiece in a manner such that a spherical surface, having a center of curvature at the intersection of the first and second axes, is generated by the cutting action of said tool;
(e) disengaging the tool from the workpiece;
(f) de-mounting the workpiece from the common workhead;
(g) mounting a second workpiece for machining a conjugate joint member of the universal joint in the common workhead in a manner such that the center of curvature of a close fitting and conforming spherical surface to be machined in said second workpiece is coincident with the position of the center of curvature of the first workpiece during the machining thereof;
(h) revolving the second workpiece about the same axis of revolution as the first workpiece;
(i) swiveling the rotating second workpiece about the same swivel axis as the first workpiece;
(j) engaging a machining tool with the revolving and swiveling second workpiece in a manner such that a spherical surface, having a center of curvature at the intersection of the first and second axes, is generated by the machining action of said tool which is close fitting and conforms to the generated spherical surface of the first workpiece;
(k) disengaging the spherical turning tool from the second workpiece; and
(l) de-mounting the second workpiece from the common workhead.

9. A method for manufacturing universal joints of the type employing conjugate members having close fitting conforming surfaces comprising:
(a) mounting a workpiece for machining a member of a universal joint in a common workhead;
(b) simultaneously revolving the workpiece about a first axis and swiveling the workpiece about a second axis which is in perpendicular and intersecting relationship with said first axis;
(c) engaging a turning tool with the revolving and swiveling workpiece in a manner such that an unfinished spherical surface, having a center of curvature at the intersection of the first and second axes, is generated by the cutting action of said tool;
(d) disengaging the turning tool from the workpiece;
(e) engaging a grinding tool with the revolving and swiveling workpiece in a manner such that a finished spherical surface, having a center of curvature at the intersection of the first and second axes, is generated by the grinding action of said tool;
(f) de-mounting the workpiece from the common workhead;
(g) mounting a second workpiece for machining a conjugate joint member of the universal joint assembly in the common workhead in a manner such that the center of curvature of a spherical surface to be machined in said second workpiece is coincident with the position of the center of curvature of the first workpiece during the machining thereof;
(h) simultaneously revolving the second workpiece about the same axis as the first workpiece and swiveling the second workpiece about the same axis as the first workpiece which is in perpendicular and intersecting relationship with said first axis;
(i) engaging a turning tool with the revolving and swiveling second workpiece in a manner such that an unfinished spherical surface, having a center of curvature which is coincident with the center of curvature of the spherical surface of the first workpiece during the machining thereof, is generated by the machining action of said tool;
(j) disengaging the turning tool from the workpiece;
(k) engaging a grinding tool with the revolving and swiveling second workpiece in a manner such that a finished spherical surface is generated by the grinding action of said tool which is close fitting and conforms to the finished spherical surface of the first workpiece;
(l) disengaging the spherical turning tool from the second workpiece; and
(m) de-mounting the second workpiece from the common workhead.

10. A method for manufacturing universal joints of the type employing conjugate members having close fitting conforming surfaces comprising:
(a) mounting a workpiece for machining a member of a universal joint in a common workhead;
(b) indexing the workpiece about a first axis;
(c) swiveling the workpiece about a second axis which is in perpendicular and intersecting relationship with said first axis;
(d) engaging a milling tool with the swiveling workpiece in a manner such that an unfinished curved surface, having a center of curvature at the intersection of the first and second axes, is generated by the milling action of said tool;
(e) disengaging the milling tool from the workpiece;
(f) engaging a grinding tool with the swiveling workpiece in a manner such that a finished curved surface, having a center of curvature at the intersection of the first and second axis, is generated by the grinding action of said tool;
(g) de-mounting the workpiece from the common workhead;
(h) mounting a second workpiece for machining a conjugate joint member of the universal joint assembly in the common workhead in a manner such that the center of curvature of a curved surface to be machined in said second workpiece is coincident with the position of the center of curvature of the first workpiece during the machining thereof;
(i) indexing the second workpiece about the same axis as the first workpiece;
(j) swiveling the second workpiece about the same axis as the first workpiece which is in perpendicular and intersecting relationship with said first axis;
(k) engaging a milling tool with the swiveling second workpiece in a manner such that an unfinished curved surface, having a center of curvature which is coincident with the center of curvature of the spherical surface of the first workpiece during the machining thereof, is generated by the milling action of said tool;
(1) disengaging the milling tool from the workpiece;
(m) engaging a grinding tool with the swiveling second workpiece in a manner such that a finished spherical surface is generated by the grinding action of said tool which is close fitting and conforms to the curved surface of another member of the universal joint;
(n) disengaging the grinding tool from the second workpiece; and
(o) de-mounting the second workpiece from the common workhead.

11. A method for manufacturing universal joints of the type employing conjugate members having close fitting conforming surfaces comprising:

(a) mounting a workpiece for machining a member of a universal joint in a common workhead;
(b) simultaneously revolving the workpiece about a first axis and swiveling the workpiece about a second axis which is in perpendicular and intersecting relationship with said first axis;
(c) engaging a turning tool with the revolving and swiveling workpiece in a manner such that an unfinished spherical surface, having a center of curvature at the intersection of the first and second axes, is generated by the cutting action of said tool;
(d) disengaging the turning tool from the workpiece;
(e) engaging a grinding tool with the revolving and swiveling workpiece in a manner such that a finished spherical surface, having a center of curvature at the intersection of the first and second axes, is generated by the grinding action of said tool;
(f) indexing the workpiece about the first axis;
(g) swiveling the workpiece about the second axis;
(h) engaging a milling tool with the swiveling workpiece in a manner such that an unfinished ball race, having a center of curvature at the intersection of the first and second axes, is generated by the milling action of said tool;
(i) disengaging the milling tool from the workpiece;
(j) engaging a grinding tool with the swiveling workpiece in a manner such that a finished ball race, having a center of curvature at the intersection of the first and second axes, is generated by the cutting action of said tool; and
(k) de-mounting the workpiece from the common workhead.

* * * * *